Figure 1:
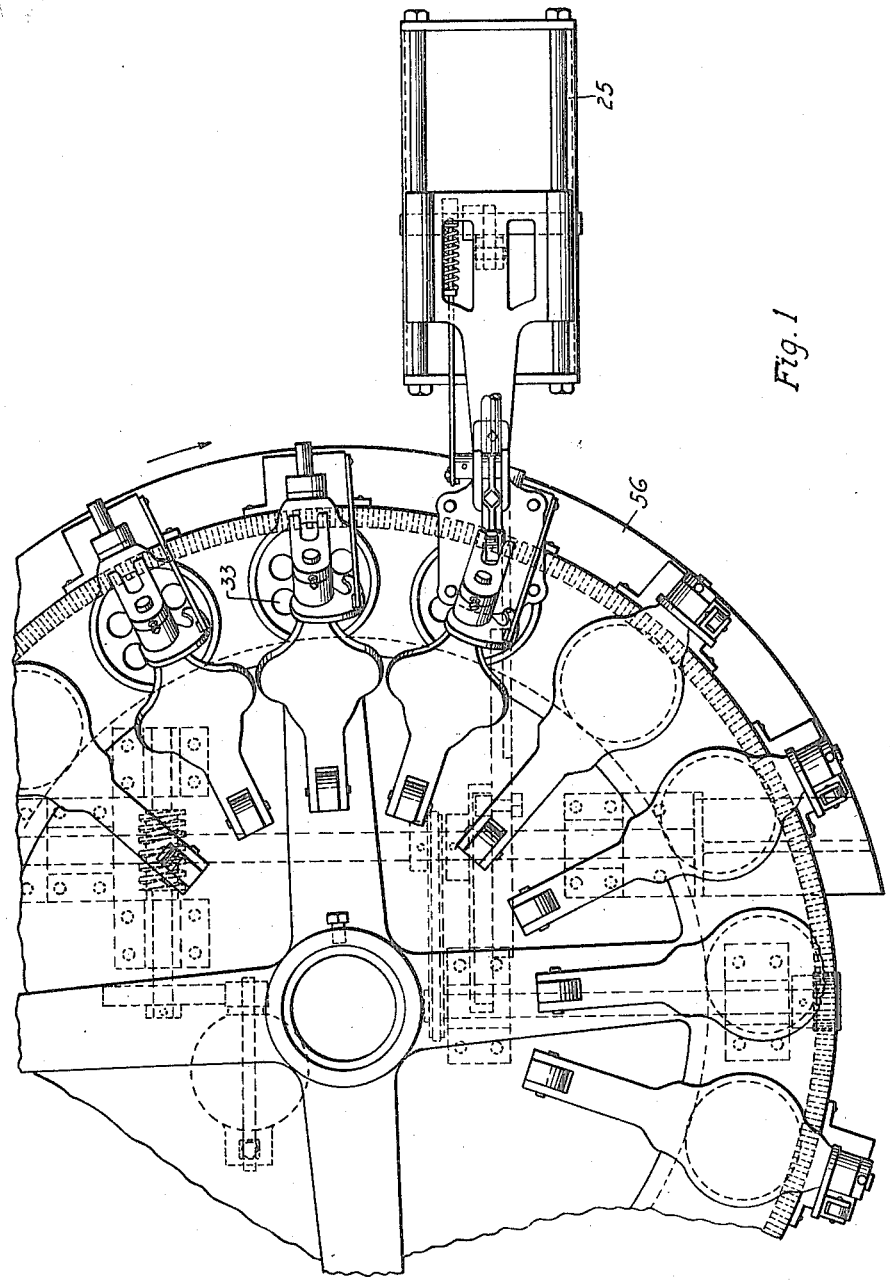

July 1, 1924.  1,499,494
S. E. WINDER
MOLDING AND BAKING MACHINERY
Filed March 13, 1920  2 Sheets-Sheet 1

INVENTOR:
SAMUEL E. WINDER
Andrews & Lundell
ATTORNEYS.

July 1, 1924.
S. E. WINDER
1,499,494
MOLDING AND BAKING MACHINERY
Filed March 13, 1920  2 Sheets-Sheet 2
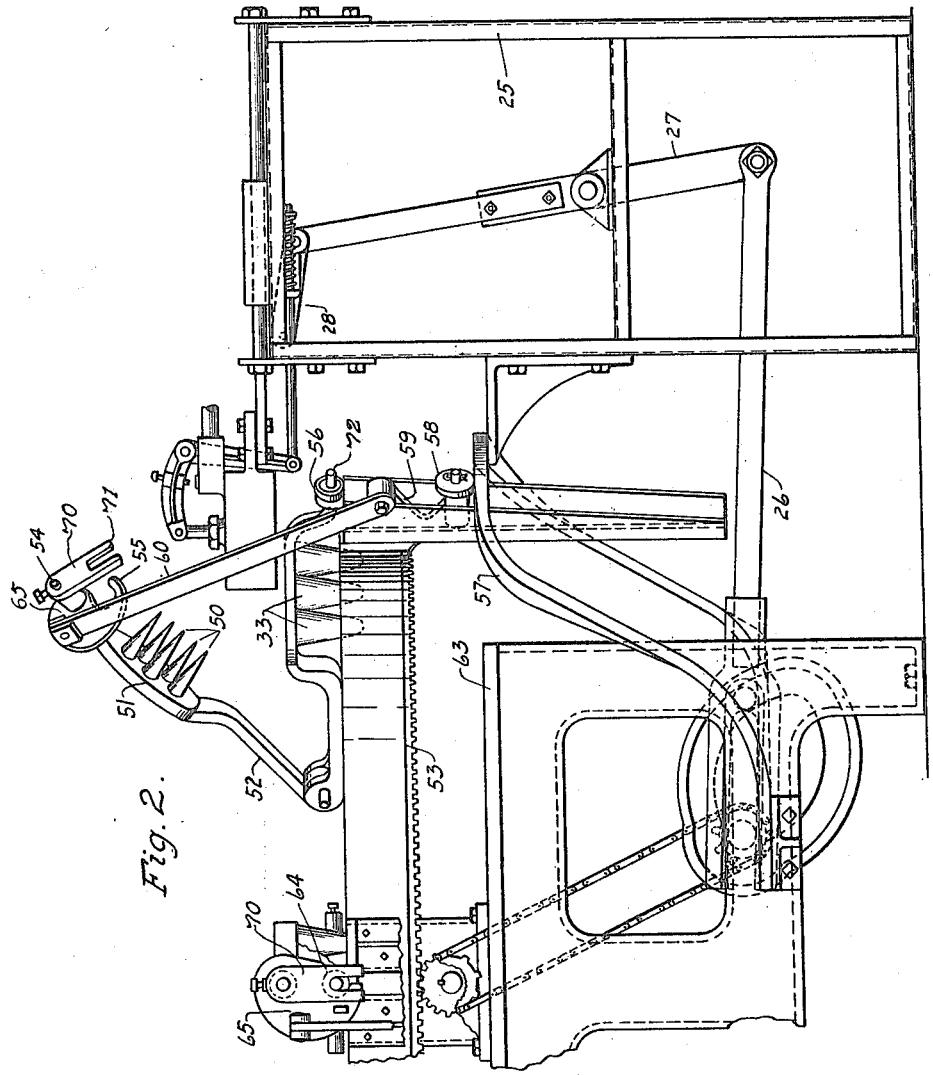
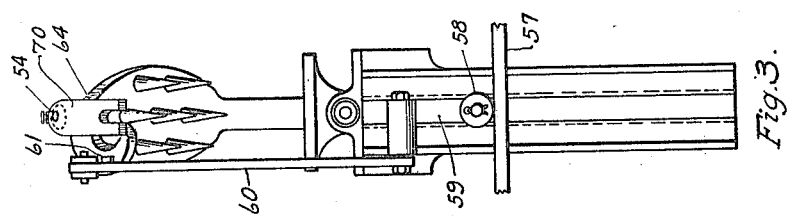
INVENTOR:
SAMUEL E. WINDER
Andrews & Lundell
ATTORNEYS Patented July 1, 1924.

1,499,494

UNITED STATES PATENT OFFICE.

SAMUEL E. WINDER, OF CHICAGO, ILLINOIS, ASSIGNOR TO NOVELTY PRODUCTS, INC., OF CHICAGO, ILLINOIS, A CORPORATION OF ILLINOIS.

MOLDING AND BAKING MACHINERY.

Application filed March 13, 1920. Serial No. 365,424.

*To all whom it may concern:*

Be it known that I, SAMUEL E. WINDER, a citizen of the United States, residing at Chicago, in the county of Cook and State of Illinois, have invented certain new and useful Improvements in Molding and Baking Machinery, of which the following is a specification.

This invention relates to machines for molding and baking edibles such as ice-cream cones, dessert cups and the like, and this application is a continuation in part of my application for patent Serial Number 343,274, filed December 8, 1919, and reference may be had to said application for a fuller description of certain portions of the invention which are not materially involved in this application.

One of the objects of this invention is to provide suitable mechanism for molding and baking batter, and particularly for manipulating the molding mechanism.

Of the accompanying drawings Fig. 1 is a plan view of a portion of a machine which embodies features of my invention; Fig. 2 is a side elevation of the same; and Fig. 3 is a front elevation of a certain portion of the machine.

In order to illustrate my invention I have selected for its application an ice-cream cone molding and baking machine. Any suitable means may be used for feeding batter to the molding machine. I prefer for the purpose the feeding device which is illustrated and described in my aforesaid application for patent, but it is to be understood that the particular form of feeding device used is not material to the present invention, and the feeding may be by hand if desired. The feeding device which I prefer is used to supply in proper quantities and times a predetermined amount of ice-cream cone batter to a plurality of molds in the machine in which the cones are molded and then baked.

The feeding device comprises a plurality of chambers into which the batter passes and from which the batter is forced, at the proper times, into the molds 33 of the molding machine. Suitable mechanism is provided for operating the feeding mechanism at the proper time and for forcing it over the molds. This mechanism comprises a reciprocating arm 26 which is operated in any suitable manner, such as by the driving mechanism of the molding machine. The reciprocating arm 26 operates a lever 27 pivoted to the framework 25 of the feeding mechanism, and the upper end of the lever 27 operates a link 28 which is pivoted to the feeding device 12. The feeding device, which is slidably mounted in the frame 25, is thus forced forwardly at the proper time over the molds 33 of the molding machine, and the batter in the chambers is passed into the molds.

The molding machine which I have illustrated in this instance comprises a well known form of ice-cream molding and baking machine, and consists in part of the molds 33 and the plungers 50, which, at suitable times, are forced into the molds 33, and are locked in that position until the batter has been sufficiently baked. If the molds are not suitably locked in position steaming of the batter while being baked may force the molds upwardly and may form undesirable deformations of the cones. At the same time it is evident that the plungers at proper times must be removed entirely away from the molds so as to allow the feeding device to pass over the molds without coming in contact with the plungers. The means which I have provided for locking and unlocking and removing the plungers from the molds a suitable distance comprise the following:

The plungers are fixed to a plate 51 pivoted by an arm 52 to any suitable point of the rotatable table 53 of the machine, the arm 52 being of sufficient length to allow the plungers to be moved upwardly from the molds after the baking process without injury to the cones. A pin 54 projects from the outer side of the plate 51 and has pivoted thereto a plate 65 having a hook 55 which is adapted, when the plungers are in place, to hook under the roller 56 rotatably mounted in the table 53 of the machine. A cam way 57 is fixed to the framework 63 of the machine, and, as the table 53 rotates, carrying with it the molds, a cam wheel 58, pivoted to a slidably mounted member 59, forces upwardly, at suitable times, the link 60 which is pivoted to the hook 54.

Normally when the cam wheel 58 is in its lowest position, the plungers are in place in the molds, the link 60 is down, and the hook 55 is hooked beneath the roller 56. As the cam wheel 58 is raised by the cam 57 the link 60 is forced upwardly, and the upper end of the link rotates the hook 55 and thus unhooks it from the roller 56; and when the pin 61, which is fixed to the plate 65, comes in contact with the link 60, the plate 65 ceases to rotate and the link raises the plate 51 to the position indicated in Fig. 2, the plungers then being out of the way of the feeding mechanism. The feeding mechanism is then forced forward, just missing the link 60, and deposits in the respective molds a suitable amount of batter, and is returned just in time to miss the link 60 on the next mold, it being understood that the table 53 is rotating continuously, and the entire feeding process is carried on while the molds, as well as the feeding device, is in motion. After the feeding device has been returned to its right hand position, the cam wheel 58, passing off from the upper portion of the cam 57, allows the force of gravity to press downwardly the plate 51 and the link 60 until the hook 55 is in such a position that the link 60 can rotate the hook under the roller 56 and lock the plungers in place. A guide 70 is fixed to the pin 54, and, as the molds are moved downwardly, the tines 71 of the fork pass on opposite sides of the pin 72, and thus guide the plungers exactly to the center of the molds when the plungers pass downwardly to the lowest position.

As the mold plungers 50 tend to stick to the baked cones, I also provide the following described means for breaking the plungers loose from the cones: A shoulder 64 is formed on the hook plate 65 so that the shoulder projects slightly below the upper surface of the roller 56 when the hook 55 is under the roller. As the plate 65 is rotated, and after the hook is unhooked, the shoulder 64 acts as a cam on the roller 56 and forces the plate 51, and thus the plungers 50, upwardly away from the cones. After thus breaking the plungers loose from the cones, the link 60, coming in contact with the pin 61, raises the plungers without difficulty.

I claim as my invention:

1. Mechanism for molding and cooking semi-liquid substances comprising a plurality of molds, a plunger for each of said molds adapted to be forced into said molds, means for locking said plungers in said molds, means for unlocking said locking means and for elevating said plungers from said molds, said locking means comprising a pivoted hook member adapted to be rotated by said unlocking means, and a shoulder formed on said hook member adapted to break the plungers away from the cooked substance.

2. Mechanism for molding and cooking semi-liquid substances comprising a plurality of molds, a plunger for each of said molds adapted to be forced into said molds, means for locking said plungers in said molds, means for unlocking said locking means and for elevating said plungers from said molds, a rotatable member, said locking means comprising a hook fixed to said rotatable member said rotatable member being adapted to be rotated by said unlocking means, said member having a stop thereon adapted to come in contact with said unlocking means and to prevent further rotation of said member when said hook is unhooked, whereby said unlocking means then elevates said plungers.

3. Mechanism for molding and cooking semi-liquid substances comprising a mold, a plunger adapted to be forced into said mold, means for locking said plunger in said mold, means for unlocking said locking means and for elevating said plunger from said mold, a rotatable member adapted to be rotated by said unlocking means, said locking means comprising a hook fixed to said rotatable member, said member having a stop thereon adapted to come in contact with said unlocking means and to prevent further rotation of said member when said hook is unhooked whereby said unlocking and elevating means then elevates said plunger.

In testimony whereof, I hereunto set my hand.

SAMUEL E. WINDER.